(12) United States Patent
Li et al.

(10) Patent No.: US 8,317,980 B2
(45) Date of Patent: Nov. 27, 2012

(54) REACTOR FOR CONVERTING WASTE MATERIALS INTO FUEL, A FEEDING SYSTEM FOR FEEDING WASTE MATERIALS INTO THE REACTOR, AND METHODS FOR CONVERTING WASTE MATERIALS INTO FUEL

(75) Inventors: Jianguo Li, Woodridge, IL (US); Xurong Zhao, Nantong (CN)

(73) Assignee: Nantong Tianyi Environment and Energy Technology Limited Corporation, Nantong, Jiangsu Province (CN)

( * ) Notice: Subject to any disclaimer, the term of this patent is extended or adjusted under 35 U.S.C. 154(b) by 99 days.

(21) Appl. No.: 12/755,744

(22) Filed: Apr. 7, 2010

(65) Prior Publication Data

US 2010/0256429 A1   Oct. 7, 2010

Related U.S. Application Data

(63) Continuation-in-part of application No. 12/401,744, filed on Mar. 11, 2009, which is a continuation-in-part of application No. 12/211,988, filed on Sep. 17, 2008, now abandoned.

(51) Int. Cl.
*C10B 1/10* (2006.01)
*C10B 43/06* (2006.01)

(52) U.S. Cl. .............. 201/2; 201/2.5; 201/33; 202/117; 202/241; 202/249; 202/262

(58) Field of Classification Search .............. 201/2, 2.5, 201/4, 8, 25, 32, 33; 202/117, 131, 136, 202/241, 249, 262; 585/240, 241
See application file for complete search history.

(56) References Cited

U.S. PATENT DOCUMENTS

| 1,508,578 | A |   | 9/1924  | Ruhr             |         |
|-----------|---|---|---------|------------------|---------|
| 1,560,855 | A |   | 11/1925 | Queneau          |         |
| 1,587,256 | A |   | 6/1926  | Toupet et al.    |         |
| 2,622,059 | A | * | 12/1952 | Lesher           | 201/28  |
| 2,851,173 | A |   | 9/1958  | Morrison         |         |
| 3,178,361 | A |   | 4/1965  | Bailey           |         |
| 3,201,329 | A |   | 8/1965  | Burt             |         |
| 3,549,000 | A |   | 12/1970 | Christian et al. |         |
| 3,616,266 | A | * | 10/1971 | Hall et al.      | 202/118 |
| 4,235,676 | A |   | 11/1980 | Chambers         |         |

(Continued)

FOREIGN PATENT DOCUMENTS

CN       2399389       10/2000

(Continued)

*Primary Examiner* — Jill Warden
*Assistant Examiner* — Joye L Woodard
(74) *Attorney, Agent, or Firm* — Ladas & Parry LLP

(57) ABSTRACT

A reactor having a shaft protruding through one end, a fuel output tube protruding through a second end, shovels housed inside, and a discharge tube, is provided. A first end of the discharge tube is inside of the reactor and the second end protrudes out of the fuel output tube. A helix thruster can be inside the discharge tube and have a driver shaft with a first gear inside of the reactor. The reactor can also include a residue collector and a fork. The fork can be disposed on a driven shaft including a second gear, which engages the first gear of the helix thruster. A system for feeding materials into the reactor is also disclosed as well as methods of converting waste plastic or rubber into fuel using the reactor.

11 Claims, 15 Drawing Sheets

U.S. PATENT DOCUMENTS

| | | | |
|---|---|---|---|
| 4,374,704 A * | 2/1983 | Young | 202/117 |
| 4,589,354 A | 5/1986 | Faehnle | |
| 4,851,601 A | 7/1989 | Fukuda et al. | |
| 4,881,947 A | 11/1989 | Parker et al. | |
| 5,082,534 A * | 1/1992 | Breu | 202/131 |
| 5,194,069 A | 3/1993 | Someus | |
| 5,449,439 A * | 9/1995 | Heald | 201/15 |
| 5,711,235 A * | 1/1998 | May et al. | 110/257 |
| 5,789,636 A | 8/1998 | Holighaus et al. | |
| 5,811,606 A | 9/1998 | Yang | |
| 5,917,102 A | 6/1999 | Holighaus et al. | |
| 6,143,136 A | 11/2000 | Aulbaugh et al. | |
| 7,329,329 B2 | 2/2008 | Masemore et al. | |
| 7,341,646 B2 * | 3/2008 | Nichols et al. | 202/117 |
| 7,642,394 B1 * | 1/2010 | Carle et al. | 588/321 |
| 7,749,359 B2 | 7/2010 | Flottvik | |
| 2006/0076224 A1 * | 4/2006 | Ku | 202/99 |
| 2008/0210538 A1 * | 9/2008 | Clark | 202/131 |

FOREIGN PATENT DOCUMENTS

CN 2474537 1/2002

* cited by examiner

REACTOR FOR CONVERTING WASTE MATERIALS INTO FUEL, A FEEDING SYSTEM FOR FEEDING WASTE MATERIALS INTO THE REACTOR, AND METHODS FOR CONVERTING WASTE MATERIALS INTO FUEL

CROSS REFERENCE TO RELATED APPLICATIONS

The present application is a continuation-in-part application of U.S. Ser. No. 12/401,744, filed on Mar. 11, 2009, which is a continuation-in-part application of U.S. Ser. No. 12/211,988, filed on Sep. 17, 2008, the contents of which are expressly incorporated herein by reference.

FIELD OF THE INVENTION

Aspects of the present invention relate to the recycling and, more particularly, to equipment used in the recycling of waste materials.

BACKGROUND

With the rapid development of the plastic industry, plastic articles are becoming increasingly important in industrial production, as well as in our daily lives. More waste plastic is generated with the abundant applications of plastics. Since waste plastic is almost non-decomposable in its original manufactured condition, it poses a serious problem for the survival of our environment. As such, it becomes important to solve the environmental issues caused by waste plastic, as well as other waste materials.

SUMMARY

In one aspect of the present invention, a residue discharging system is contemplated. The discharging system includes a reactor having a wall extending between a first end and a second end of the reactor. The wall can be cylindrically shaped, cone shaped, and the like. A reaction vessel shaft protrudes through the first end of the reactor and a fuel output tube protrudes through the second end of the reactor. At least one shovel is housed inside of the reactor. The residue discharging system also includes a first discharge tube extending from inside of the reactor to outside of the reactor. The first discharge tube can be housed within the fuel output tube and a helix thruster can be housed within the first discharge tube. Moreover, a power source is in communication with the helix thruster to cause rotation thereof. A residue storage tank can also be in communication with, and/or connected to an end of the first discharge tube outside of the reactor. In certain embodiments, a second discharge tube can connect the first discharge tube and the residue storage tank.

In particular embodiments, the at least one shovel is disposed on an inner wall of the reactor and in various embodiments, a plurality of shovels are housed inside of the reactor. The plurality of shovels can also be disposed on the inner wall of the reactor.

In aspects of the present invention, the first discharge tube protrudes through a filter and the filter is in communication with the fuel output tube.

The helix thruster can comprise a driver shaft, a spiral vane disposed on the driver shaft, and a first gear at an end of the driver shaft housed inside of the reactor.

Also, at least one residue collector can be housed inside of the reactor. The at least one residue collector can be disposed on an end of the first discharge tube that is housed inside of the reactor and it can include at least one fork disposed therein. The fork can be disposed on a driven shaft, and the driven shaft can further comprise a second gear, which engages the first gear of the helix thruster. In certain embodiments, a plurality of forks is disposed on the driven shaft.

In particular embodiments, the power source can be a motor, which is in communication with a clutch, a reducing mechanism, and the helix thruster.

In another aspect, a feeding system is disclosed. The feeding system can be used to feed materials into the reactor. The materials may include rubber, plastic, other materials to be vaporized or recycled, catalysts, and the like. The feeding system can include a hopper having a material level sensor and a first pressure shutter disposed therein. The first pressure shutter can be in communication with a pressure shutter power source. The feeding system can also include an apron conveyor configured to shuttle materials into the hopper. There is a feeding tube in communication with the hopper and the feeding tube has a first end and a second end. Another feature of the system is a propelling pole, which pushes materials from a feeding tube into the reactor. A second end of the feeding tube is in communication with a reactor shaft and the reactor shaft has a first end and a second end. The first end of the reactor shaft is in communication with the second end of the feeding tube and the second end of the reactor shaft is in communication with the reactor.

Aspects of the feeding system can further include a vertical slide board disposed in the hopper, which divides the hopper into a first section and a second section. The first section can include the material level sensor and be in communication with the apron conveyor. The second section can be configured to store a catalyst therein. Also, the vertical slide board can include a catalyst electromagnetic entrance.

In certain aspects of the present invention, the propelling pole is a hydraulic ram and in other aspects, it is a variable screw-pitch helix thruster. In particular embodiments, a hydraulic workstation applies hydraulic pressure to the propelling pole to push waste materials from the feeding tube into the reactor. In other embodiments, a motor powers the propelling pole.

A second pressure shutter can be disposed in the hopper in certain aspects of the present invention. Each of the first and second pressure shutters can include a gear disposed thereon, wherein the gears are in communication with each other due to the presence of a transmission chain, belt, or the like, and activation of the pressure shutter power source causes rotation of the transmission chain. Rotation of the transmission chain causes rotation of the gears disposed on the first and second pressure shutters and hence, causes rotation of the first and second pressure shutters.

All aspects of the aforementioned feeding system, such as the rotation of the pressure shutters, the movement of the apron conveyor and propelling pole, and the opening and closing of the catalyst electromagnetic entrance, as well as aspects of the discharging system, such as rotation of the helix thruster and rotation of the reactor, can be electronically controlled by a programmable logic controller.

Other aspects of the present invention are directed to a method of converting waste materials into a fuel condensate, gasoline, diesel, oil, and/or other hydrocarbon fractions. The method may include some or all of the following steps, not necessarily in the order provided. The method can include the steps of providing a reactor having a wall extending between a first end and a second end of the reactor. The wall can be cylindrically shaped, cone shaped, and the like. The reactor includes a reaction vessel shaft protruding through the first end of the reactor and a fuel output tube protruding through the second end of the reactor and the fuel output tube is in communication with a filter and a condenser. At least one shovel is housed inside of the reactor and a first discharge tube extends from an inside of the reactor to an outside of the reactor wherein the first discharge tube is housed within the fuel output tube. The first discharge tube includes a helix thruster housed therein. Finally, a power source is in communication with the helix thruster.

Another step of the method is providing a feeding system to transport the waste materials into the reactor wherein the feeding system includes an apron conveyor in communication with an upper end of a hopper, a feeding tube in communication with a lower end of the hopper, a propelling pole in communication with the feeding tube and wherein the reaction vessel shaft is in communication with the feeding tube and the first end of the reactor.

The method can also include the steps of rotating the reactor, heating the reactor, transporting the materials and a catalyst into the hopper, moving the materials from the hopper to the feeding tube, activating the propelling pole to push the materials from the feeding tube into the reactor, vaporizing the materials inside of the reactor, collecting any of the materials that were not vaporized in the shovel and transporting the materials from the shovel to the first discharge tube, activating the power source in communication with the helix thruster to cause rotation thereof, transporting the materials from the first discharge tube to a residue storage tank, transporting the vapor through the fuel output tube and the filter to the condenser, and condensing the vapor.

Aspects of the method may also include the step of transporting the condensed vapor from the condenser through an oil-water separator to obtain an oil phase product.

Aspects may also include the step of transporting the oil phase product to a mixing tank and adding a catalyst to the mixing tank while in certain embodiments, the step of refining the oil phase product to produce gasoline, diesel, oil, and/or other hydrocarbon fractions is included.

BRIEF DESCRIPTION OF THE DRAWING FIGURES

DETAILED DESCRIPTION

The following description concerns embodiments of a reaction vessel, discharging systems used therein, a system used to feed materials into the vessel, and methods of using the same. The reaction vessels disclosed herein can be interchangeably referred to as a vessel, reactor, distillation vessel, and the like.

Figure 1:
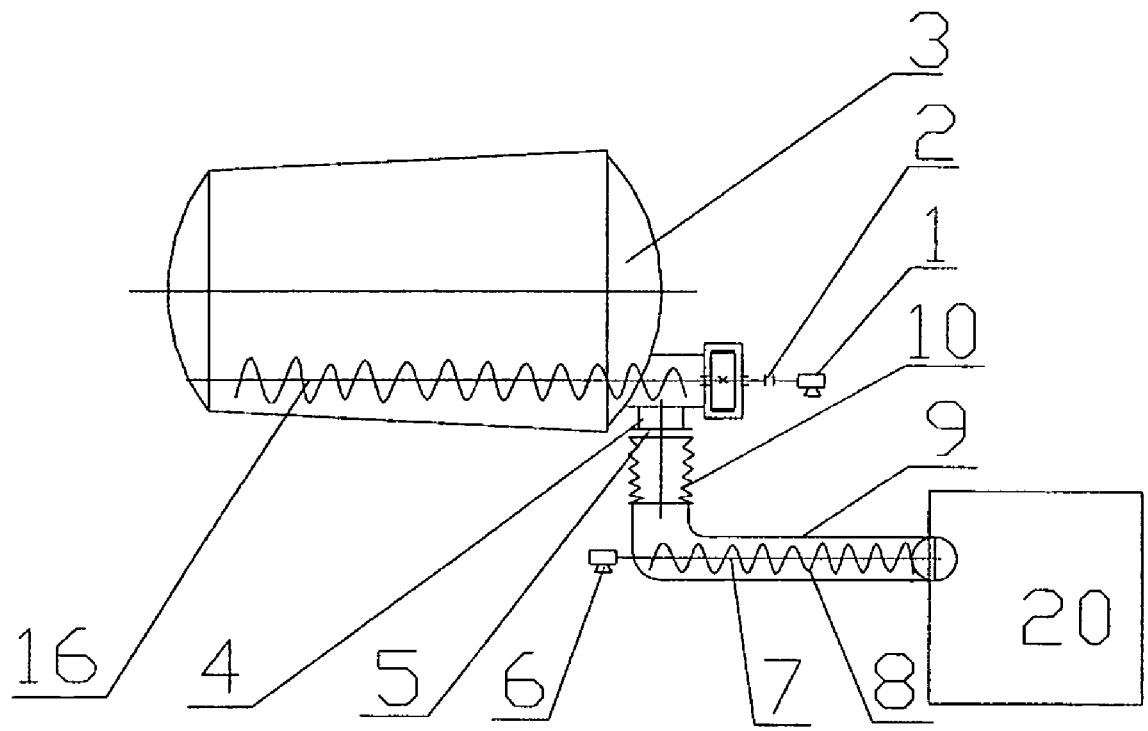
FIG. 1 is a side view of a reaction vessel and discharging system according to an embodiment of the present invention.

As shown in FIG. 1, an embodiment of the present invention includes a reaction vessel 3. The reaction vessel 3 has a wall, preferably a cone-shaped wall or a cylindrically shaped wall, which makes up its body, The wall extends between a first and a second end of the vessel and the vessel 3 has a total length of up to 24 feet, preferably about 15-21 feet. The first and second ends of the vessel can be configured to any suitable operating diameters although in a preferred embodiment, the diameter of the second end is in a range of from about 72-144 inches. Furthermore, the reaction vessel 3 can be made from any suitable material that can handle the high temperatures that the vessel is exposed to, such as iron, an alloy steel, and the like. The reaction vessel 3 may also be housed inside of a kiln structure 27 (shown in FIGS. 5 and 6).

Figure 3:
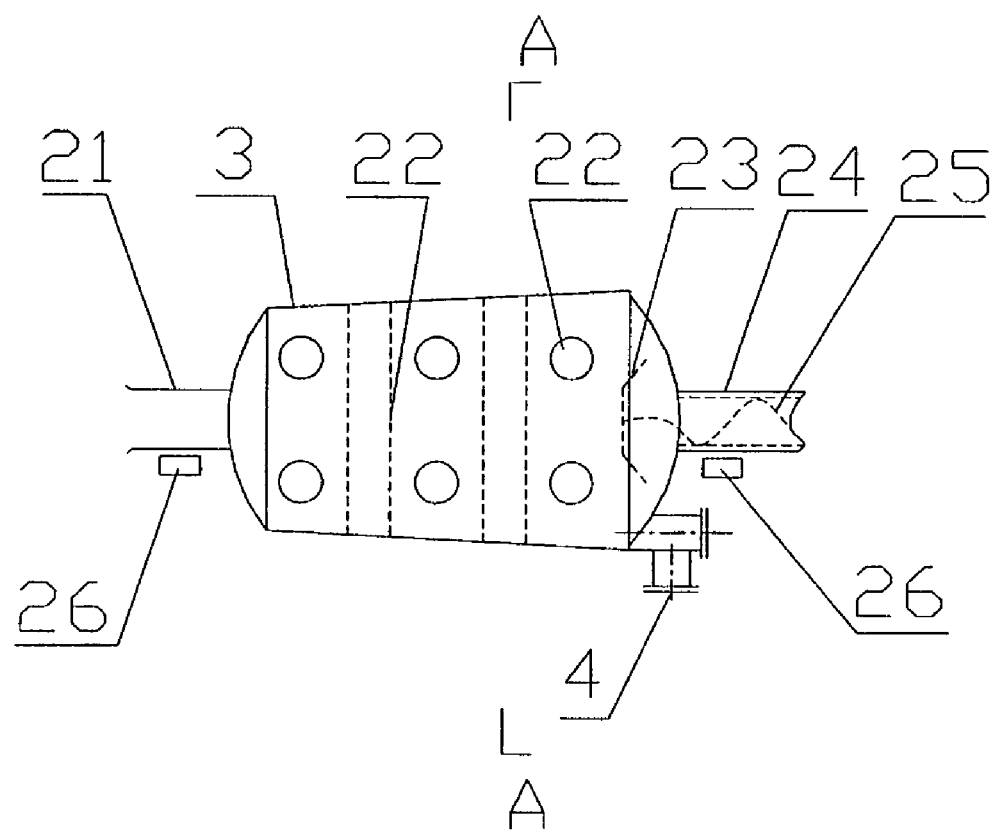
FIG. 3 is a cross-sectional side view of a reactor according to certain embodiments of the present invention.
Figure 4:
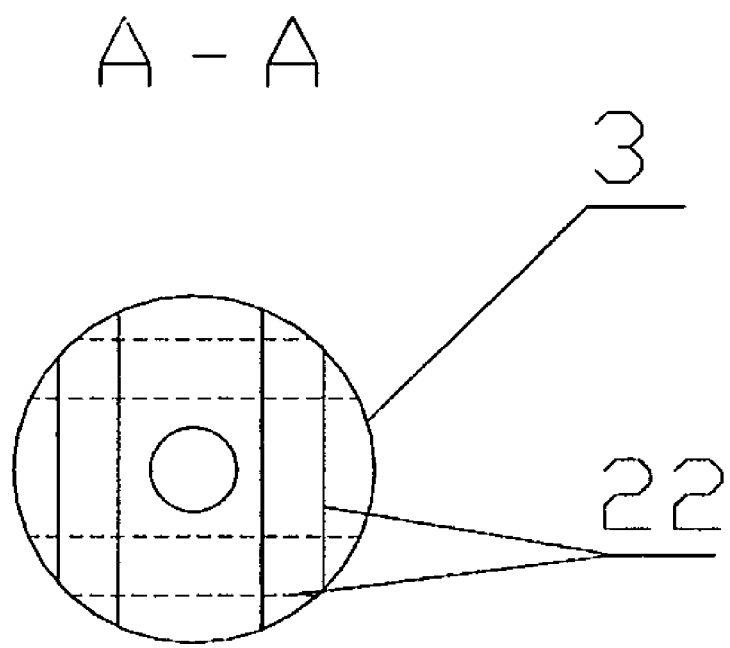
FIG. 4 is a sectional view along line A-A as shown in FIG. 3 or FIG. 5.

FIG. 3 shows a feed-in entrance 21 protruding through the first end of the reaction vessel 3. The feed-in entrance 21 can be connected to an automatic hydraulic feeder (not shown) or any other known method to perform feeding or continuous feeding of the waste plastic or rubber. Moreover, the feed-in entrance 21 can be situated on or engaged with, and supported by, a support bearing 26. At the second end of the reaction vessel 3, a residue discharge outlet 4 is shown protruding therethrough. The residue discharge outlet 4 can also be referred to as a curved tube. An oil or gas output tube 24 is also shown protruding through the second end of the vessel 3. The oil or gas output tube 24 or fuel output tube 24 can have a helix thruster 25 and a filter (not shown) disposed therein. Also, the oil or gas output tube 24 can be situated on or engaged with, and supported by, a support bearing 26. A shield 23 is placed inside of the vessel 3 near an entrance of the oil or gas output tube 24 to block unwanted residue from escaping through this tube. If the unwanted residue were to get into the oil or gas output tube 24, the helix thruster 25 set in the tube can push the residue back into the vessel 3. The shield 23, feed-in entrance 21, residue discharge outlet 4, oil or gas output tube 24, helix thruster 25, and support bearings 26 can be made from any suitable materials that can handle the operating temperatures of the vessel 3, such as iron, an alloy steel, and the like.

A plurality of supporting tubes 22 are housed inside of the reaction vessel 3 wherein the supporting tubes 22 protrude through the wall of the reaction vessel 3 and open out. These supporting tubes 22 can be arranged horizontally, vertically, diagonally, and any combination thereof inside of the vessel 3. The quantity of supporting tubes 22 used depends upon the length of the reaction vessel 3 where a longer vessel 3 could require more supporting tubes 22. Each end of the supporting tubes 22 goes through the vessel wall and opens out so heated air or gas can be supplied therethrough. When the vessel 3 is housed inside of a kiln structure 27, the air or gas inside of the kiln 27 is heated and in turn, heats the vessel and flows through the open ends of the supporting tubes 22 to heat them as well. With the supporting tubes 22 going through the vessel 3, the waste plastic or rubber therein is evenly heated and the reaction vessel 3 is capable of achieving much higher operating temperatures than a vessel 3 not including the supporting tubes 22. The supporting tubes 22 can have any suitable diameter, preferably a diameter of up to 200 mm, and be made from any material that can withstand the operating temperatures that the vessel 3 is exposed to such as seamless steel, an alloy steel, iron, and the like.

As a result of the placement of the supporting tubes 22 inside of the reaction vessel 3, the strength of the vessel 3 is greatly improved. Due to the high temperatures that can be achieved inside of the vessel 3, such as 450° C., and outside of the vessel 3, such as 800° C., the shape of the vessel 3 could easily become distorted as it does with the vessels in the prior art. However, the vessel 3 of the present invention is not subjected to the shape distortion problems associated with the prior art reaction vessels at least because of the supporting tubes 22 of the present invention. Also due to the supporting tubes 22, the first and second ends of the vessel 3 can have a much larger diameter than those found in the prior art so the vessel is capable of handling the demand of large-scale manufacturing. Moreover, the life of the vessel 3 is greatly increased due to the supporting tubes 22. Finally, the supporting tubes 22 allow the waste plastic or rubber to be heated evenly inside of the vessel 3, which causes a complete reaction of all of the waste plastic or rubber into vapor.

In an embodiment of the present invention, the reaction vessel 3 further includes a rotation mechanism. The rotation mechanism allows the vessel 3 to continuously rotate, preferably about the center longitudinal axis, during operation. The rotation mechanism can include a motor that supplies power and facilitates rotation of a first and a second gear (not shown), whereby rotation of the first and second gears allows rotation of the vessel 3. In a preferred embodiment, the second gear is provided on the vessel 3, preferably the feed-in entrance 21 comprises the second gear, so that rotation of the first and second gears facilitates rotation of the reaction vessel 3. Although the rotation mechanism can comprise a motor, and a first and second gear, various other rotation mechanisms can be used, such as pulleys, magnets and the like, in accordance with the present invention as is commonly known by those skilled in the art.

The vessel 3 of certain embodiments of the present invention can be used in a method of converting waste plastic or rubber into fuel oil. The method may include any or all of the following steps, not necessarily in the order as described. A motor is activated whereby the motor facilitates rotation of a first and a second gear, wherein the second gear is provided on the reaction vessel 3, causing the reaction vessel 3 to rotate. Waste plastic or rubber and a catalyst are then manually or automatically fed through the feed-in entrance 21. The catalyst can be alumina based, silicon dioxide based, or any other catalyst useful in method of converting waste plastic or rubber into fuel oil. The reaction vessel 3 and the supporting tubes 22 are then heated. An operating temperature of up to 800° C., and preferably about 700° C., can be achieved outside of the vessel 3. Moreover, the inside of the vessel can be heated to a temperature of about 400° C. to 450° C. Such a high operating temperature inside of the vessel 3 is attributable to the supporting tubes 22 incorporated in the vessel 3, and a vessel not including these supporting tubes 22 would not be capable of achieving such high temperatures.

The waste plastic or rubber is then transformed from a solid to a liquid state with the increasing temperature. The liquid is then converted into a gas or vapor phase under the action of the catalyst and the waste plastic or rubber vapor flows through the oil or gas output tube 24 and exits the vessel 3. This vapor is then condensed into a mixture of liquid hydrocarbons in a condensor (not shown), before which the dust impurities carried by the vapor are separated in a settler (not shown). The condensate is then transmitted from the condensor through an oil-water separator (not shown) to obtain an oil phase product. The oil phase product is then brought into a mixing tank (not shown) and the catalyst is added to the mixing tank to improve the stability of the oil phase product against oxidation. Finally, the oil phase product is refined to produce gasoline, diesel oil, or other hydrocarbon fractions.

An embodiment of the vessel 3 incorporating an aspect of a continuous residue discharging system will now be described. With respect to FIG. 2, a high temperature, separable, continuous residue discharging system includes two sub-systems: a first residue discharging system and a second residue discharging system. The first residue discharging system is assembled in a reactor 3. The reactor 3 can be any type of reactor that converts plastic, rubber, industrial waste or the like into oil, fuel, or the like. The first residue discharging system is a three unilateral shaft conveyer system. However, the system may include only one shaft or any number of shafts depending on the diameter of the shafts and the size of the reactor that the shafts are housed inside of. In the embodiment shown in FIG. 2, the driver shaft 16 of the conveyor system extends the length of the reactor 3 and further into a residue discharge outlet or curved tube 4 (as shown in FIG. 1). A spiral vane 17 is disposed on the driver shaft 16.

The curved tube 4 includes a flange 5, which connects the curved tube 4 to a first tube 10. The first tube 10 has the ability to retract from the connection with the curved tube 4. Also shown in FIG. 1 is the first tube 10 as it connects to the second tube 9. In a preferred embodiment, the second tube 9 is made of steel and has a diameter of 325 mm but this tube can be made from a variety of materials known in the art and include a large range of diameter sizes. Furthermore, the second tube 9 can be an integral, single body tube or it can comprise multiple segments that are connected together to form a pathway. The second tube 9 is further attached to a residue storage tank 20. The connection of the curved tube 4 by its flange 5 to the first tube 10, the first tube 10 to the second tube 9, and the second tube 9 to the residue storage tank 20 forms a closed residue discharging channel.

Housed inside of the second tube 9 is a second residue discharging system. As shown in FIG. 1, the second residue discharging system includes a single driver shaft 7 with a spiral vane 8 disposed thereon. The spiral vane 8 can be located in between a pair of bearing components (not shown), which support the single driver shaft 7 and allow it to rotate smoothly. However, in other embodiments, the second residue discharging system can include any number of shafts.

Figure 2:
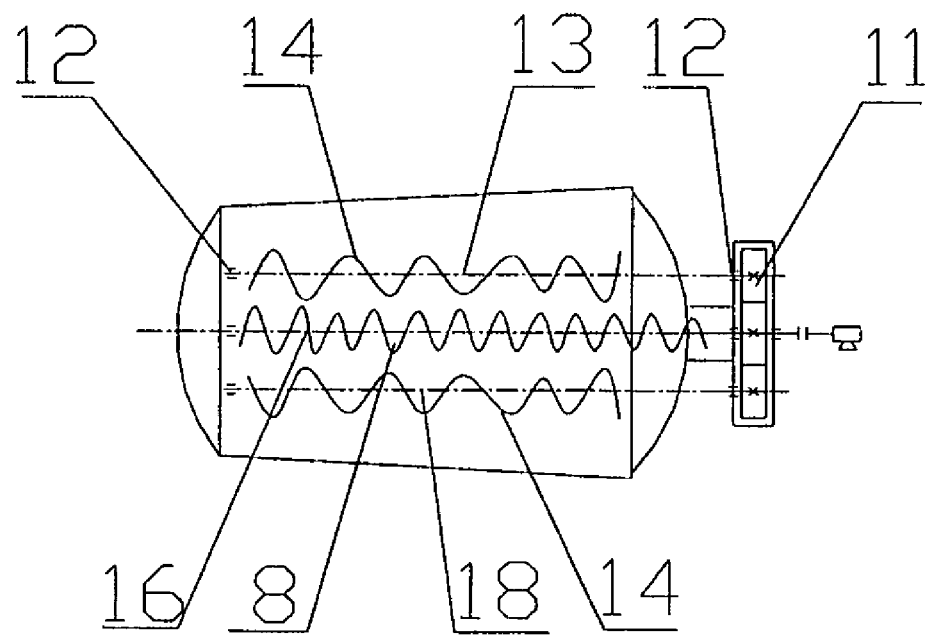
FIG. 2 is a cross-sectional top view of a reactor incorporating a preferred embodiment of the first residue discharging system of the present invention.

Also depicted in FIGS. 1 and 2 are the sources used to power the system. A first power source 1 delivers power, through a clutch 2, to the driver shaft 16 of the first residue discharging system. The second power source 6 is also shown. This power source delivers power to the single driver shaft 7 of the second residue discharging system. The power sources 1,6 can include an engine and a decelerator.

As shown in FIG. 1, an embodiment of the first residue discharging system includes a three unilateral shaft conveyor system housed in a reactor 3. The driver shaft 16 is shown as well as a first driven shaft 13 and a second driven shaft 18. The first and second driven shafts 13,18 include residue collecting vanes 14 disposed thereon. The driver shaft 16 includes a spiral vane 8 disposed thereon. These vanes 8,14 assist in the residue collection and conveying process by moving the residue from the reactor 3 into the curved tube 4. The shafts 13,16,18 of the first residue discharging system are supported at both of their ends by bearing components 12. The bearing components 12 allow for smooth rotation of each shaft 13,16, 18. Also shown (but not labeled) is the curved tube 4 and the driver shaft 16 is extending therethrough. The driver shaft 16 includes a driver gear that is engaged with a first gear of the first driven shaft 13 and a second gear of the second driven shaft 18. All of these gears are housed inside of a gear case 11.

While the reaction vessel 3 is still at extremely high operating temperatures, the closed residue discharging channel can be formed as previously described and the residue can be discharged from the vessel 3. Accordingly, as shown in FIGS. 1 and 2, the first tube 10 is connected to the flange 5 on the curved tube 4. The first power source 1 is activated and transfers power, through the clutch 2, to the driver shaft 16. The second power source 6 is also activated and it transfers power to the single driver shaft 7. As power is transferred to these shafts 7,16 they begin to rotate. Rotation is smooth because the shafts 7,16 are supported on bearing components 12. As the driver shaft 16 begins to rotate, its driver gear rotates causing the first and second gears of the first and second driven shafts 13,18 to rotate, which in turn, causes the first and second driven shafts 13,18 to rotate. The residue collecting vanes 14 disposed on the first and second driven shafts 13,18 and the spiral vane 8 disposed on the driver shaft 16 collect residue from inside of the reactor 3 and as rotation of the vanes 8,14 occurs, residue is pushed or conveyed towards the curved tube 4. Since the driver shaft 16 and the spiral vane 8 disposed thereon extend through the curved tube 4, the residue is pushed into the curved tube and falls down, through the first tube 10 and into the second tube 9. Once the residue falls into the second tube 9, the spiral vane 8 on the rotating single driver shaft 7 begins to push or convey the residue towards the residue storage tank 20. Once all of the high temperature, combustible residue has been transferred from the reactor 3 to the residue storage tank 20, the power sources 1,6 are deactivated, the clutch 2 is disengaged which will disconnect the first power source 1 and the driver shaft 16, and the first tube 10 is retracted from the flange 5.

Figure 5:
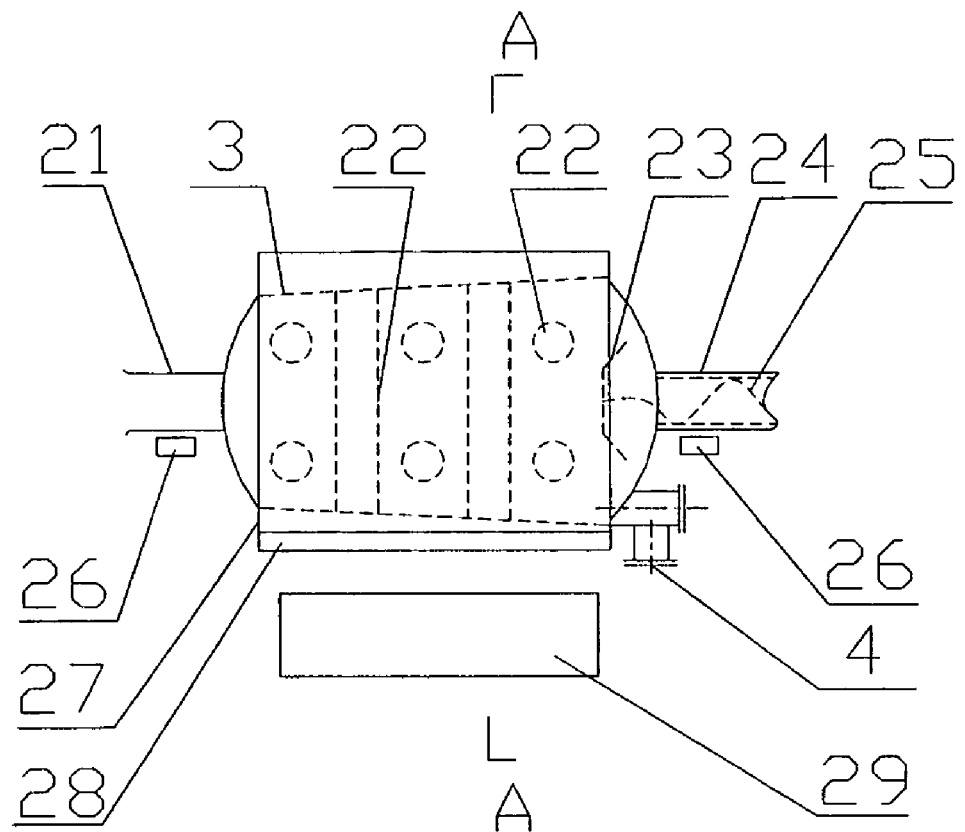
FIG. 5 is a cross-sectional side view of a reactor according to a preferred embodiment of the present invention.

FIG. 5 shows an embodiment of the present invention wherein the reactor 3 is housed inside of a kiln 27. Under the reactor 3 and inside the kiln 27 is a heat insulation wall 28. The heated air inside of the kiln 27 can circulate around the reactor 3 and evenly heat it. The kiln 27 and heat insulation wall 28 can be made of fire brick. The heater 29 is also shown in FIG. 5. The heater 29 heats the air or gas inside of the kiln 27 and, in turn, heats the vessel 3 and supporting tubes 22. However, in an embodiment that does not include a kiln 27, the heater 29 simply heats the vessel 3 and supporting tubes 22. The heater 29 may operate by the combustion of a fuel, such as fuel oil or natural gas. It should be understood that other heaters commonly known in the art, such as an electric heater, can be used to heat the reaction vessel and supporting tubes.

Figure 6:
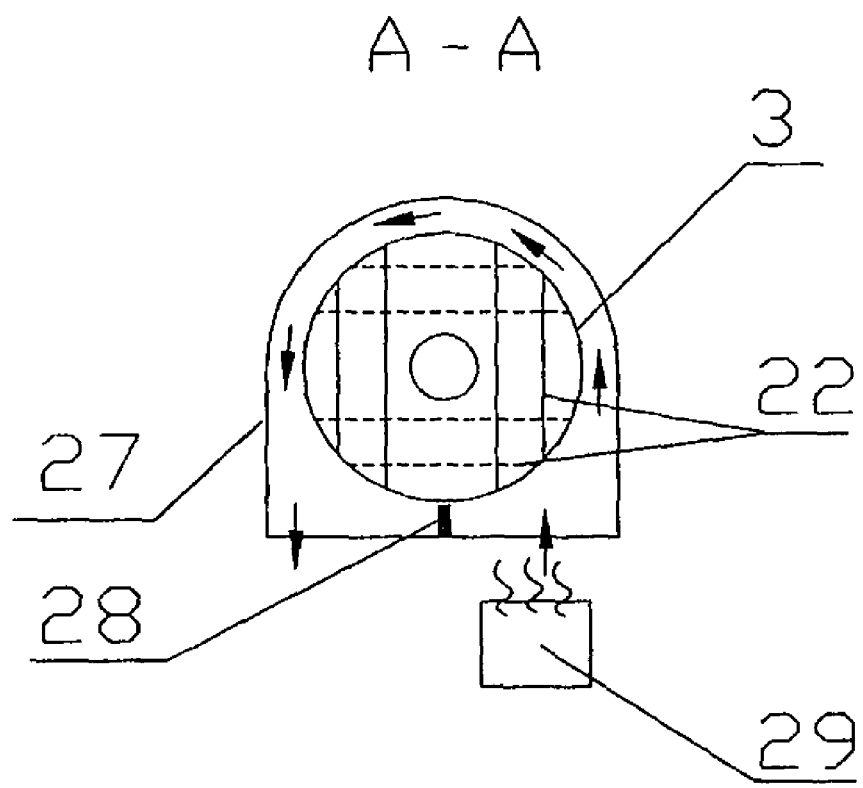
FIG. 6 is a sectional view along line A-A as shown in FIG. 3 or FIG. 5.

Depicted in FIG. 6 is an embodiment of the reactor 3 housed inside of the kiln 27. The heater 29 heats the air or gas inside of the kiln 27. In turn, the reactor 3, supporting tubes 22, and the heat insulation wall 28 are heated. The heated air or gas can circulate around the reactor 3 as shown by the arrows in FIG. 6 and also flow through the supporting tubes 22.

Figure 7:
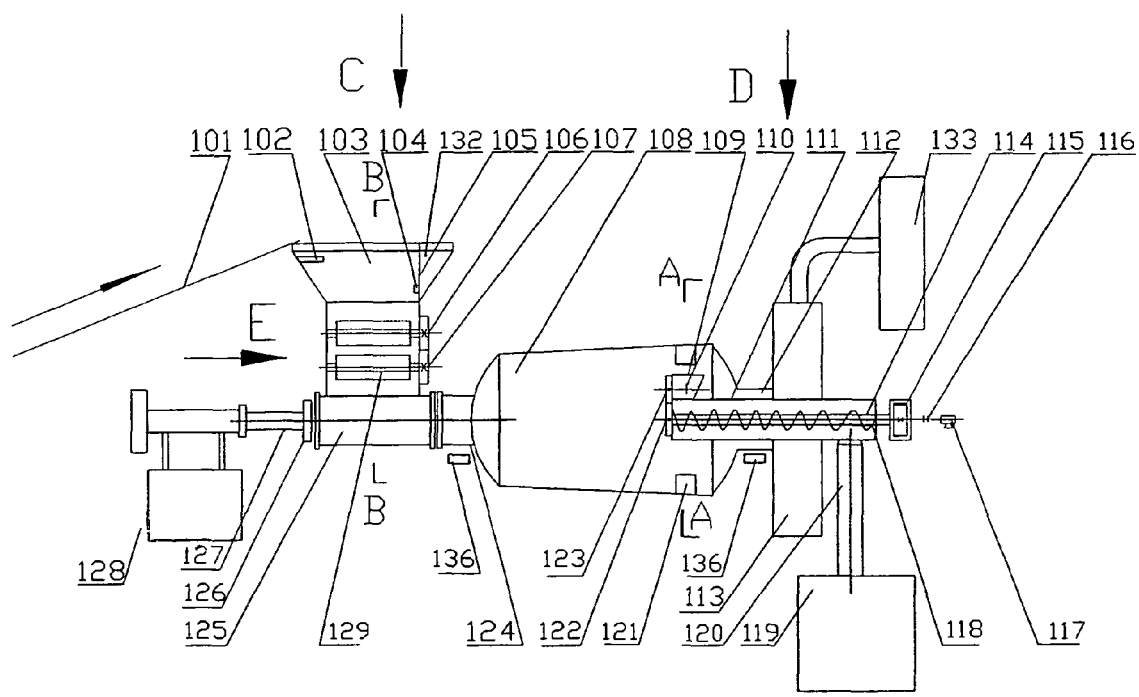
FIG. 7 is a side view of a reaction vessel, feeding system, and discharging system according to an embodiment of the present invention.

As shown in FIG. 7, an embodiment of the present invention includes a reaction vessel 108. The reaction vessel 108 has a wall, which makes up the body of the reaction vessel. In certain embodiments, the wall is cone-shaped, cylindrically shaped, or the like. The wall extends between a first and a second end of the vessel 108, and the vessel 108 can have a total length as required by the user. In particular embodiments, the length can be from less than 1 up to 25 feet, and, in certain embodiments, the length is about 15-21 feet. The first and second ends of the vessel 108 can be configured to any suitable operating diameters, although, in certain embodiments, the diameter of the second end is in a range of about 72-144 inches. Furthermore, the reaction vessel 108 can be made from any suitable material such as iron, an alloy steel, and the like, that can handle the high temperatures that the vessel 108 is exposed to. The reaction vessel 108 may also be housed inside of a kiln structure 139 (shown in FIG. 13).

FIG. 7 also shows a feeding system including a feed-in entrance or hopper 103 in communication with the first end of the reaction vessel 108. At the second end of the reaction vessel 108, a first discharge tube 111 is shown housed therein. The first discharge tube 111 can be housed inside of a fuel output tube 112. The fuel output tube 112 is referred to herein interchangeably as an oil output tube, a gas output tube, an oil or gas output tube, and the like. The fuel output tube 112 is shown protruding through the second end of the vessel 108. The fuel output tube 112 can have a helix thruster 135 (shown if FIG. 13) disposed therein and can be situated on or engaged with, and supported by, a support bearing 136 (shown in FIG. 13). A shield 134 (shown in FIG. 13) can be placed inside of the vessel 108 near an entrance of the fuel output tube 112 to block unwanted residue from entering this tube 112. Unwanted residue is generated during the process of converting the plastic, rubber, or other materials into vapor. The residue can generally comprise unreacted or unvaporized plastic, rubber, etc. If the unwanted residue were to enter the fuel output tube 112, the helix thruster 135 set therein can push the residue back into the vessel 108. The helix thruster 135 can be connected to a power source, such as a motor.

In certain embodiments, the motor or other power source delivers power, through a clutch, to the helix thruster 135. A reducing mechanism can also be used in accordance with certain embodiments of the present invention. The reducing mechanism is an independent transmission between the motor and the helix thruster 135. It can function to reduce the rotation speed of the motor and supply the appropriate speed of rotation to the helix thruster 135.

The aforementioned and later mentioned components of the vessel 108, the discharging systems, and the feeding system can be made from any suitable materials known in the art, or, if necessary, any materials that can handle the operating temperatures of the vessel 108, such as iron, an alloy steel, and the like.

Figure 13:
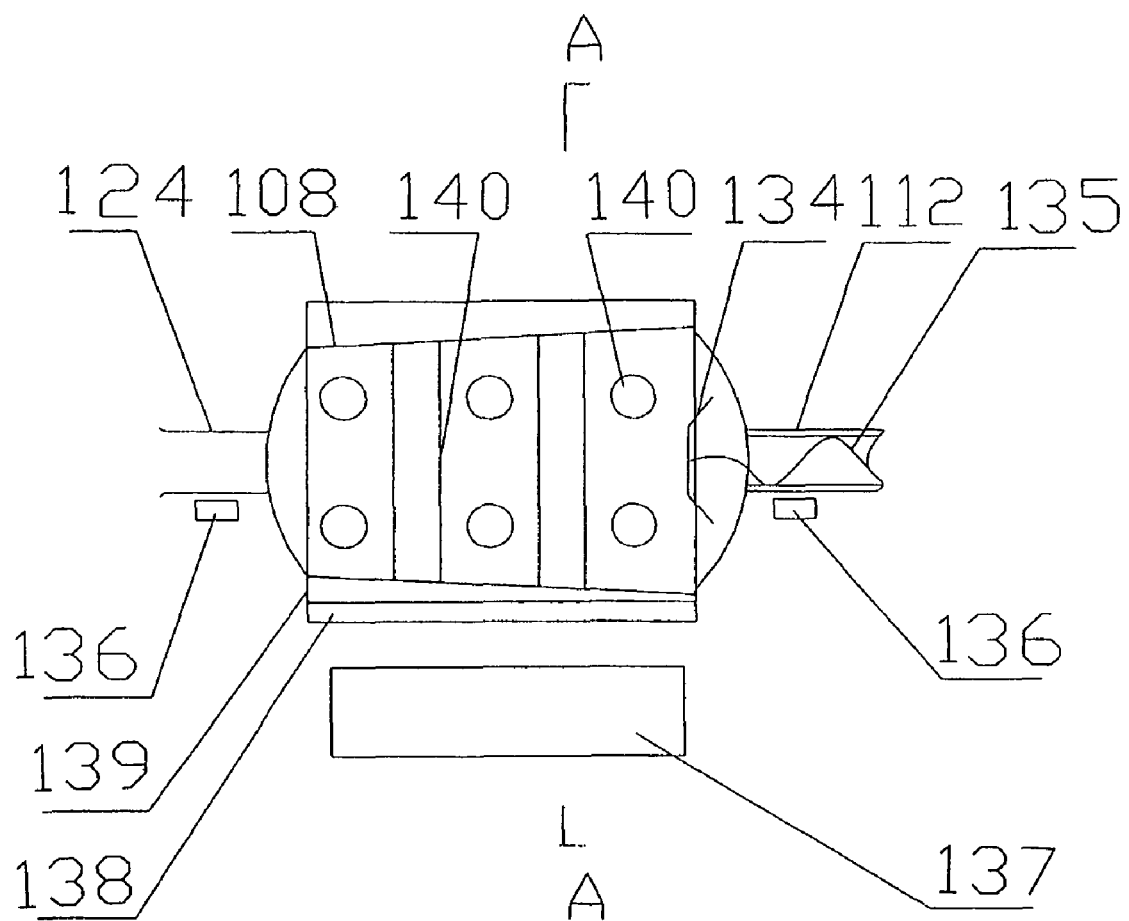
FIG. 13 is a side view of an embodiment of the reaction vessel.

In certain embodiments, a plurality of supporting tubes 140 can be housed inside of the reaction vessel 108 wherein the supporting tubes 140 protrude through the wall of the reaction vessel 108, as can be seen in FIG. 13. These supporting tubes 140 are hollow and can be arranged horizontally, vertically, diagonally, and any combination thereof inside of the vessel 108. The quantity of supporting tubes 140 used depends upon the length of the reaction vessel 108 where a longer vessel 108 could require more supporting tubes 140. Each end of the supporting tubes 140 goes through the vessel wall and is open so heated air or gas can be supplied therethrough. When the vessel 108 is housed inside of a kiln structure 139, the air or gas inside of the kiln 139 is heated and in turn, heats the vessel 108 and flows through the open ends of the supporting tubes 140 to heat the supporting tubes 140 as well. With the supporting tubes 140 going through the vessel 108, the waste plastic, rubber, or other materials therein are evenly heated and the reaction vessel 108 is capable of achieving much higher operating temperatures than a vessel 108 not including the supporting tubes 140. The supporting tubes 140 can have any suitable diameter, preferably a diameter of up to 200 mm, and can be made from any material that can withstand the operating temperatures that the vessel 108 is exposed to such as seamless steel, an alloy steel, iron, and the like.

As a result of the placement of the supporting tubes 140 inside of the reaction vessel 108, the strength of the vessel 108 can be greatly improved. Due to the high temperatures that can be achieved inside of the vessel 108, such as about 500° C. or less, and outside of the vessel 108, such as about 800° C. or less, the shape of the vessel 108 can easily become distorted. Also due to the supporting tubes 140, the first and second ends of the vessel 108 can have a much larger diameter than those found in the prior art so the vessel is capable of handling the demand of large-scale manufacturing. Moreover, the life of the vessel 108 can be greatly increased due to the supporting tubes 140. Finally, the supporting tubes 140 allow the waste plastic or rubber to be heated evenly inside of the vessel 108, which greatly assists in causing a complete reaction of all of the waste plastic, rubber, etc. into vapor.

In an aspect of the present invention, the reaction vessel 108 further includes a rotation mechanism. The rotation mechanism allows the vessel 108 to continuously rotate, preferably about the center longitudinal axis, during operation. The rotation mechanism can include a motor that supplies power and facilitates rotation of a first and a second gear (not shown), whereby rotation of the first and second gears allows rotation of the vessel 108. In an embodiment, the second gear is provided on the vessel 108 so that rotation of the first and second gears facilitates rotation of the reaction vessel 108. In certain embodiments, the reaction vessel shaft 124 comprises the second gear. Further, the fuel output tube 112 and the reaction vessel shaft 124 can be situated on one or more bearing components 136, which provide support thereto and allow for smooth rotation. Although the rotation mechanism can comprise a motor, and a first and second gear, various other rotation mechanisms can be used, such as pulleys, magnets and the like, in accordance with the present invention.

Upon activation of the rotation mechanism, the reactor 108, the fuel output tube 112, and the reactor shaft 124 continuously rotate about the reactor's longitudinal axis or the axis parallel with the first discharge tube 111. The fuel output tube 112 sealingly engages a filter 113. In one aspect of the present invention, a seal ring, or a similar sealing member, is located at the point of contact between the fuel output tube 112 and the filter 113. Similarly, the reactor shaft 124 can sealingly engage the feeding tube 125 and a seal ring, or similar sealing member, is located at the point of contact between the feeding tube 125 and reactor shaft 124. While the fuel output tube 112 is rotating with the reactor 108, the filter 113 remains stationary. The first discharge tube 111 also remains stationary. Materials inside of the reactor 108 become vaporized and the vapor travels from the reactor to the fuel output tube 112. From the fuel output tube 112, the vapor travels to the filter 113, and then to a condenser 133. Occasionally, there are small particles in the oil and/or gas vapor exiting the vessel 108 through the fuel output tube 112, and the filter 113 acts to remove these particles before the oil and/or gas vapor arrives at the condenser 133. In certain aspects, the filter 113 has a hole in its center, similar to a doughnut, and the first discharge tube 111 protrudes therethrough. Although there may be a hole in the center of the filter 113, the filter 113 is sealed around the hole so vapors do not escape therefrom.

FIG. 13 shows an aspect of the present invention wherein the reactor 108 is housed inside of a kiln 139. Under the reactor 108 and inside of the kiln 139 is a heat insulation wall 138. The heated air inside of the kiln 139 can circulate around the reactor 108 and evenly heat it. The kiln 139 and heat insulation wall 138 can be made of fire brick or a similar material as known in the art. The heater 137 is also shown in FIG. 13. The heater 137 heats the air or gas inside of the kiln 139 which, in turn, heats the vessel 108 and supporting tubes 140. However, in an embodiment that does not include a kiln 139, the heater 137 simply heats the vessel 108 and supporting tubes 140. The heater 137 may operate by the combustion of a fuel, such as fuel oil or natural gas. It should be understood that other heaters commonly known in the art, such as an electric heater, can be used to heat the reaction vessel 108, supporting tubes 140, and other components of the present invention.

Figure 14:
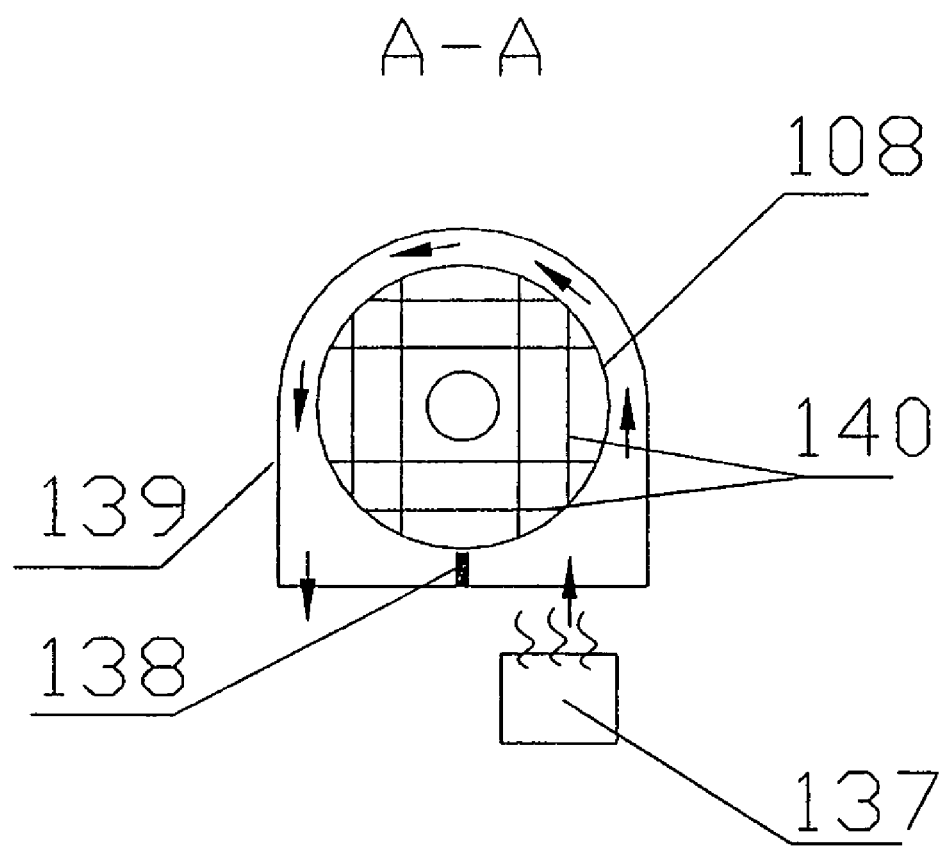
FIG. 14 is a cross-sectional view of an embodiment of the reaction vessel.

FIG. 14 depicts the reactor 108 housed inside of the kiln 139. The heater 137 heats the air or gas inside of the kiln 139. In turn, the reactor 108, supporting tubes 140, and the heat insulation wall 138 are heated. The heated air or gas can circulate around the reactor 108 as shown by the arrows in FIG. 14 and also flow through the supporting tubes 140.

A residue discharging system that can be used in accordance with certain embodiments of the present invention will now be described. As the waste materials undergo the vaporization process inside of the reactor 108, there can be a situation where all of the waste materials are not vaporized. The non-vaporized material becomes unwanted residue that can detract from the overall vaporization process or the overall performance of the reaction vessel 108.

Figure 12:
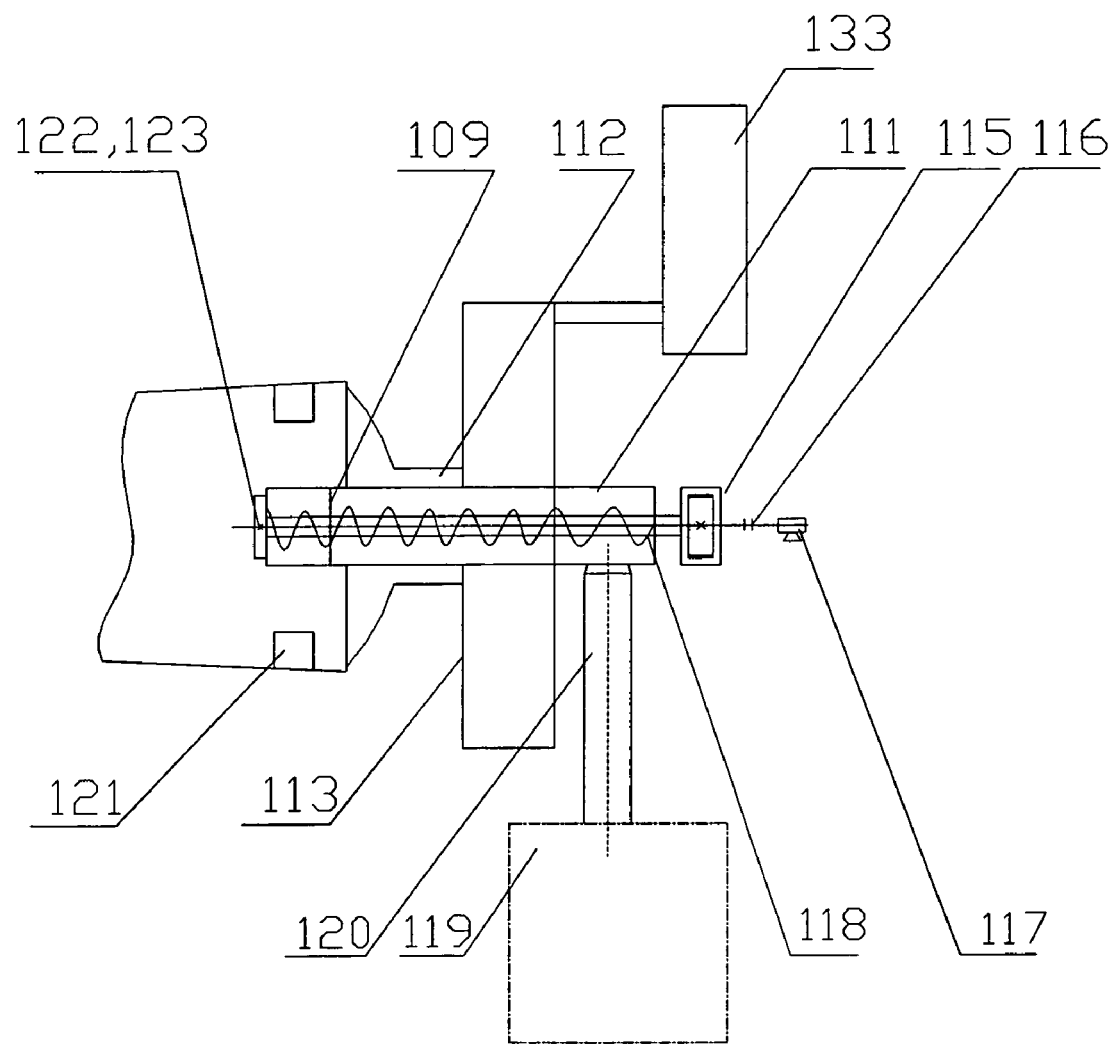
FIG. 12 is a side view of an embodiment of the discharging system.

FIG. 12 depicts an aspect of a high temperature, continuous residue discharging system. As can be seen, the system includes one or more residue shovels 121 housed inside of the reactor 108. The shovels 121 can be disposed on the inner wall of the reactor 108. In certain embodiments, as the reaction vessel 108 rotates, residue gravitates towards the second end of the vessel and becomes scooped into the shovels 121. Due to the particular configuration of the shovels 121, once the shovels reach the top portion of the vessel 108 during rotation, the residue is spilled out. The shovel 121 or shovels can be made from any material that can withstand the operating temperatures that the vessel 108 is exposed to such as an alloy steel, iron, and the like. The shovels 121 can be placed anywhere inside of the vessel 108 where they would be capable of engaging the residue and any number of shovels 121 can be used in accordance with certain aspects of the present invention.

Figure 8:
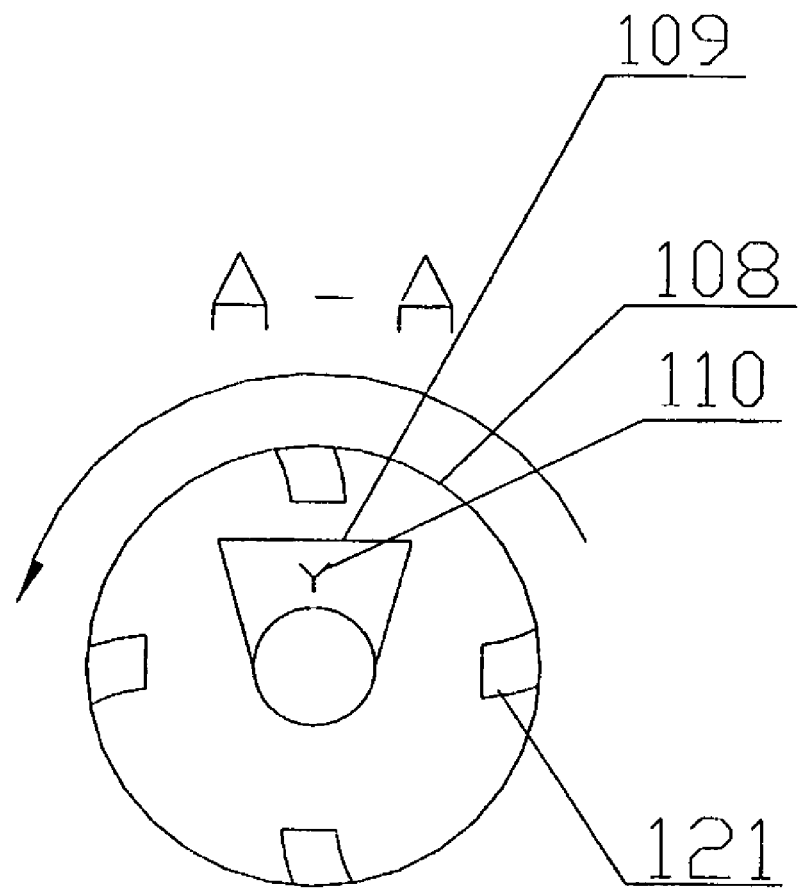
FIG. 8 is a cross-sectional view of a reaction vessel incorporating an embodiment of the residue discharging system of the present invention.

A residue collector 109 can also be housed inside of the vessel 108. Aspects of the present invention can include one or more residue collectors 109 as desired by the user. In certain embodiments, the residue collector 109 is situated on top of, and in communication with, a first discharge tube 111 and both of these components 109, 111, as well as the filter 113, are stationary while the reactor 108 and the fuel output tube 112 are rotating. In an aspect of the present invention, as a shovel 121 filled with residue reaches the uppermost point in the reactor 108 during its rotation, the residue falls out of the shovel 121 and into the residue collector 109. The residue collector 109 can act as a funnel for directing the residue into the first discharge tube 111. In particular embodiments, a residue collector 109 is not used and the residue falls directly into the first discharge tube 111. As with a funnel, the bottom portion of the residue collector 109 has a hole therein, which is in communication with a hole in the first discharge tube 111. As can best be seen in FIG. 8, the residue collector 109 may have one or more forks 110 disposed therein. The forks 110 can act to scrape residue from the inner sides of the residue collector 109 and facilitate movement of the residue into the first discharge tube 111. The forks 110 can be disposed on a driven shaft and the driven shaft may comprise a second gear 123, which provides for rotation of the driven shaft. Although referred to herein as "forks," the forks 110 are not limited to a fork shape and may take the form of other shapes such as a spoon, flat edge, and the like.

A helix thruster 118 can be housed inside of the first discharge tube 111. The helix thruster 118 comprises a driver shaft 114, a spiral vane disposed thereon, and a first gear 122 at an end of the driver shaft 114 housed inside of the reactor 108. The second gear 123 of the driven shaft supporting the fork 110 or forks can engage the first gear 122 of the helix thruster 118 and as such, rotation of the first gear 122 causes rotation of the second gear 123. The driver shaft 114 can be situated on one or more bearing components (not shown), which support the driver shaft 114 and allow it to rotate smoothly. As the helix thruster 118 rotates, the spiral vane disposed thereon shuttles or facilitates movement of the residue from an end of the first discharge tube 111 housed inside of the reactor 108 to an end of the first discharge tube 111, which is outside of the reactor 108 and ultimately to a residue storage tank 119. In certain embodiments, a second discharge tube 120 connects the residue storage tank 119 with the first discharge tube 111 and a sealed residue-discharging channel is thereby formed. Any number of helix thrusters 118 can be housed inside of the first discharge tube 111 in accordance with certain aspects of the present invention.

Also depicted in FIG. 12 is a motor 117, which is an example of the source used to power the discharging system. However, the power source can be one of many different types of power sources and applicable power sources are commonly known to those of ordinary skill in the art. A motor 117 delivers power, through a clutch 116, to the driver shaft 114 of the residue discharging system. A reducing mechanism 115 can also be used in accordance with certain embodiments of the present invention. The reducing mechanism 115 is an independent transmission between the motor 117 and the helix thruster 118. It can function to reduce the rotation speed of the motor 117 and supply the appropriate speed of rotation to the helix thruster 118.

A method of discharging residue in accordance with certain embodiments of the present invention will now be described with particular reference to FIGS. 7 and 12. While the reaction vessel 108 is still in operation and converting the waste materials into vapor at extremely high operating temperatures, residue can be formed. As the residue is formed, it becomes scooped up into the shovels 121 located inside of the vessel 108. As the vessel 108 rotates and the shovel reaches the top portion of the vessel 108, gravity can cause the residue to spill out of the shovel 121 and the residue falls into the first discharge tube 111. In an embodiment that incorporates one or more residue collectors 109, the residue falls into the residue collector 109 and is then transported into the first discharge tube 111.

After activation of the power source or motor 117, power is transferred, through the clutch 116 and reducing mechanism 115, to the helix thruster 118 housed inside of the first discharge tube 111. As power is transferred, the helix thruster 118 begins to rotate. The spiral vane disposed thereon shuttles the residue, which has fallen into the first discharge tube 111, from an end of the tube 111 inside of the vessel 108 to an end of the tube 111 that is outside of the vessel 108. From the end of the tube 111 that is outside of the vessel, the residue can be transported directly into a residue storage tank 119, or it can travel through a second discharge tube 120, on its way into the residue storage tank 119.

If one or more residue collectors 109 are present, as the helix thruster rotates, its first gear 122 engages the second gear 123 of the driven shaft supporting one or more forks 110 disposed in the residue collector 123. As previously mentioned, the fork 110 can act to scrape residue from the inner sides of the residue collector 109 and facilitate its movement into the first discharge tube 111.

This method can be utilized continuously during operation of the vessel 108 so it would not be necessary to stop the vaporization process in order to discharge the unwanted residue from the vessel 108.

The feeding system of certain embodiments of the present invention will now be described with particular reference to FIG. 7. The feeding system can be used to feed materials into the reactor 108. The materials may include rubber, plastic, catalysts, and the like. The feeding system can include a hopper 103 having a material level sensor 102 and a first pressure shutter 129 disposed therein. The material level sensor 102 can be any type of sensor known in the art such as a proximity sensor or an infrared sensor. The material level sensor 102 can have a cover over its top or upper portion so that it is not tripped, activated, or otherwise interfered with by materials as they first enter the hopper 103. As the materials enter the hopper 3, they begin to accumulate therein. When the materials build up in the hopper, for example, to a level about 1 cm below the material level sensor 102, particular events can be triggered.

For example, an apron conveyor 101 can be used to shuttle the materials into the hopper 103. The apron conveyor 101 can be run and controlled electronically. In one embodiment, the apron conveyor 101 is running or "on" while the materials are being transported into the hopper 103. In certain embodiments, when the amount of materials in the hopper 103 reaches a predetermined level, such as 1 cm from the material level sensor 102, the apron conveyor 101 is automatically stopped. In turn, this stops the feeding of materials into the hopper 103. Alternatively, starting and stopping of the apron conveyor 101 can be controlled by a programmable logic controller, which has been preset according to user-inputted guidelines.

Figure 11:
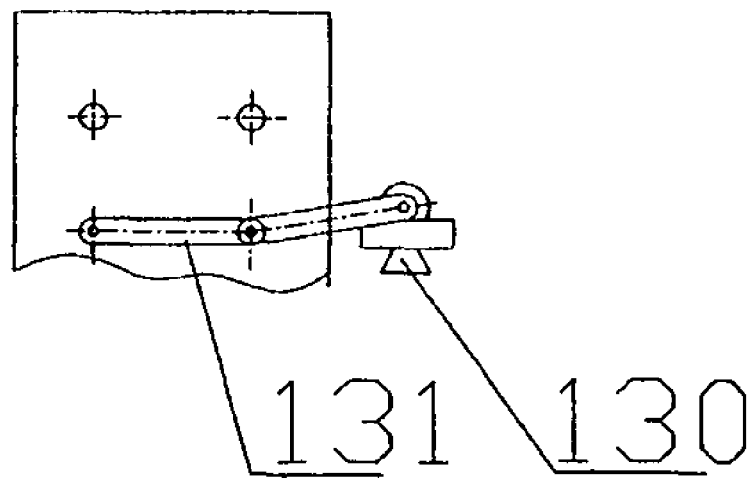
FIG. 11 is a cross-sectional side view of an embodiment of the hopper of the feeding system.

As previously noted, the hopper 103 can include a first pressure shutter 129 disposed therein. This first pressure shutter 129 can be in communication with a pressure shutter power source 130, as can be seen in FIG. 11. In certain embodiments, the automatic stopping of the apron conveyor 101 causes activation of the power source 130, which activates the first pressure shutter 129. In particular embodiments, more than one pressure shutter can be present. In other embodiments, the programmable logic controller controls the starting and stopping of the pressure shutter(s) 129 according to preset conditions.

There is a feeding tube 125 in communication with the hopper 103 and the feeding tube 125 has a first end and a second end. As the pressure shutter 129 is activated, it rotates and causes the materials to move from the hopper 103 into the feeding tube 125. As the pressure shutter 129 moves the materials into the feeding tube 125, the level of materials inside of the hopper 103 is lowered. In certain embodiments, when the level of materials reaches a predetermined distance from the material level sensor 102, such as about 18 cm below the material level sensor 102, the pressure shutter 129 is deactivated or its rotation is stopped/terminated. Alternatively, deactivation can be controlled by the programmable logic controller. In particular embodiments, once the pressure shutter 129 is stopped, a hydraulic work station 128 can be activated. Activation of the hydraulic work station 128 actuates a propelling pole 127, 150. In certain embodiments, the propelling pole is a hydraulic ram 127 and in other embodiments, the propelling pole is a variable screw-pitch helix thruster 150. If the propelling pole is a hydraulic ram 127, upon actuation, it slides into the feeding tube 125. The hydraulic ram 127 can include a terminal end 126, which is sized to be just smaller than the diameter of the feeding tube 125. The diameter of the feeding tube 125 is not particularly limited and can be chosen according to the needs of the user.

The hydraulic ram 127 enters the feeding tube 125 at a first end of the feeding tube. As the hydraulic ram 127 is actuated, it moves from the first end to the second end of the tube 125. Waste materials in the tube 125 are pushed into a hollowed reaction vessel shaft 124 and/or the reaction vessel 108. The second end of the feeding tube 125 is in communication with the reactor shaft 124 and the reactor shaft 124 has a first end and a second end. The first end of the reactor shaft 124 is in communication with the second end of the feeding tube 125 and the second end of the reactor shaft 124 is in communication with the reaction vessel or reactor 108. In certain embodiments, the hydraulic ram 127 is pushed through the feeding tube 125 to about the midpoint of the reactor shaft 124. This ensures that although an amount of materials will be pushed into the reaction vessel 108, an amount will also remain in the reaction vessel shaft 124 to create a seal so that vapor inside of the reactor cannot escape out through the reaction vessel shaft 124, feeding tube 125, and hopper 103. The hydraulic work station 128 then causes the hydraulic ram 127 to retract out of the feeding tube 125 and/or reaction vessel shaft 124. The hydraulic ram 127 can also be powered by any means known in the art and is not limited to hydraulic technology.

Figure 15:
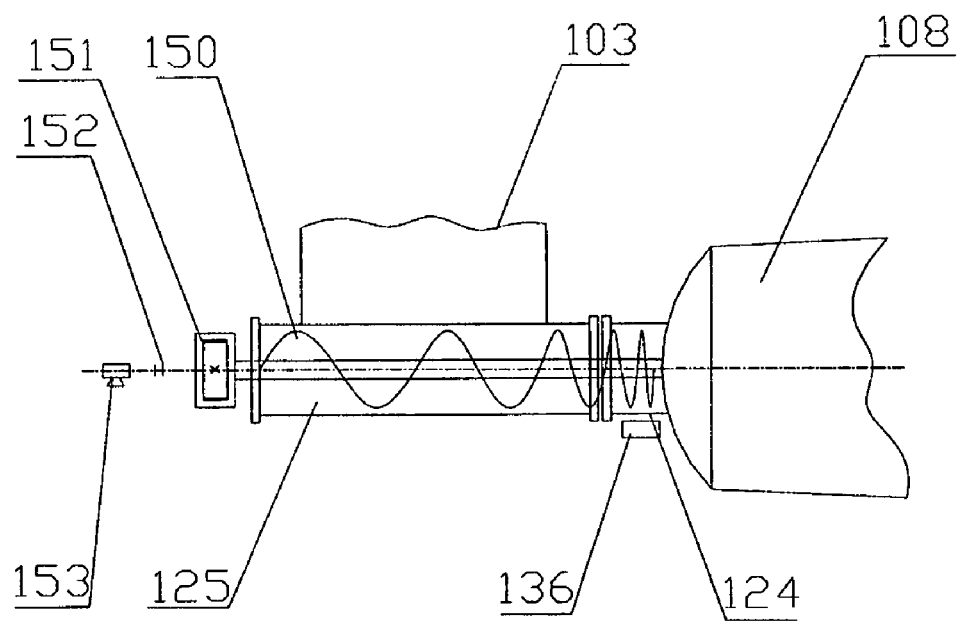
FIG. 15 is a side view of a reaction vessel and feeding system according to an embodiment of the present invention.

As opposed to a hydraulic ram 127, the propelling pole can be a variable screw-pitch helix thruster 150, similar to helix thruster 118 (see FIG. 15). As with helix thruster 118, and as shown in FIG. 15, the variable screw-pitch helix thruster 150 can comprise a driver shaft, a spiral vane disposed thereon, and can be situated on one or more bearing components, which would support the driver shaft. The spiral vane of the variable screw-pitch helix thruster 150 extends the length of the driver shaft. As the spiral vane rotates around the driver shaft, it forms various peaks and troughs. The distance between these peaks and troughs of the spiral vane is variable and decreases as it approaches the reaction vessel 108. As such, as the waste material moves from the first end of the feeding tube 125 to the second end of the feeding tube 125 and into the reactor shaft 124, it becomes compacted due to the decreasing distance between the peaks and troughs of the spiral vane. The distance between the peaks and troughs can decrease gradually or it can decrease stepwise. The compactness of the waste materials assists in forming a seal at this end of the reaction vessel 108 so that vapors do not escape therefrom.

As the variable screw-pitch helix thruster 150 rotates, the spiral vane disposed thereon shuttles or facilitates movement of the waste materials through the feeding tube 125, to an end of the reactor shaft 124, and ultimately into the reaction vessel 108. As with the hydraulic ram 127, the variable screw-pitch helix thruster 150 can be powered by any means known in the art. For example, the variable screw-pitch helix thruster 150 can be powered similarly to the helix thruster 118 as described above in detail whereby a motor 153 delivers power, through a clutch 152, and a reducing mechanism 151, to the driver shaft. The screw-pitch helix thruster 150 can be housed inside of the feeding tube 125 and can extend up to a point in the reactor shaft 124 just before the opening of the reaction vessel 108. As with the hydraulic ram 127, the variable screw-pitch helix thruster 150 can be automatically controlled by the programmable logic controller.

In certain embodiments, when the level of materials reaches a predetermined distance from the material level sensor 102, such as about 18 cm below the material level sensor 102, the apron conveyor 101 is activated and it begins to once again transport materials into the hopper 103. Re-activation of the apron conveyor 101 can also be controlled by the programmable logic controller.

Figure 10:
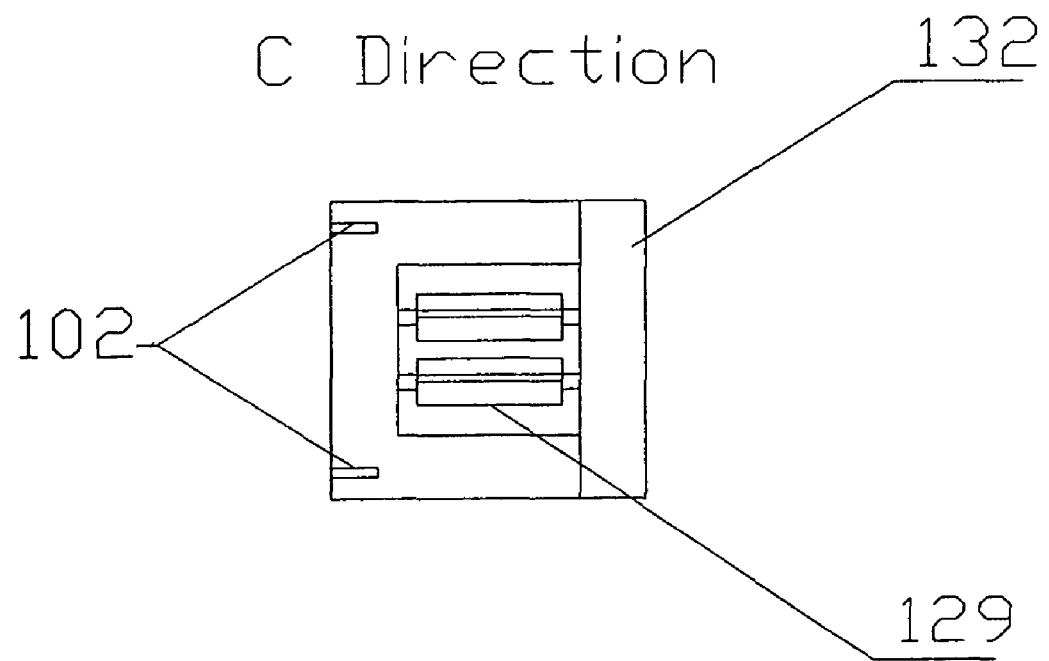
FIG. 10 is a top view of an embodiment of the hopper component of the feeding system.

As can be seen in, for example, FIG. 10, aspects of the feeding system can further include a vertical slide board 105 disposed in the hopper 103, which divides the hopper 103 into a first section and a second section. The first section can include one or more material level sensors 102 and be in communication with the apron conveyor 101. The second section 132 can be configured to store a catalyst therein. In certain embodiments, the catalyst is added by hand to the second section 132 before operation of the vessel is started. Also, the vertical slide board can include a catalyst electromagnetic entrance 104, as shown in FIG. 7. The entrance 104 can be in the form of a window or door in the vertical slide board 105 such that it can be electronically opened to allow catalyst to enter the hopper 103. Opening and closing of the entrance 104 can be controlled by the programmable logic controller as well. The catalyst can be non-heavy metal based, alumina based, silicon dioxide based, or any other catalyst useful in recycling, vaporizing, and/or converting waste materials into fuel oil.

Figure 9:
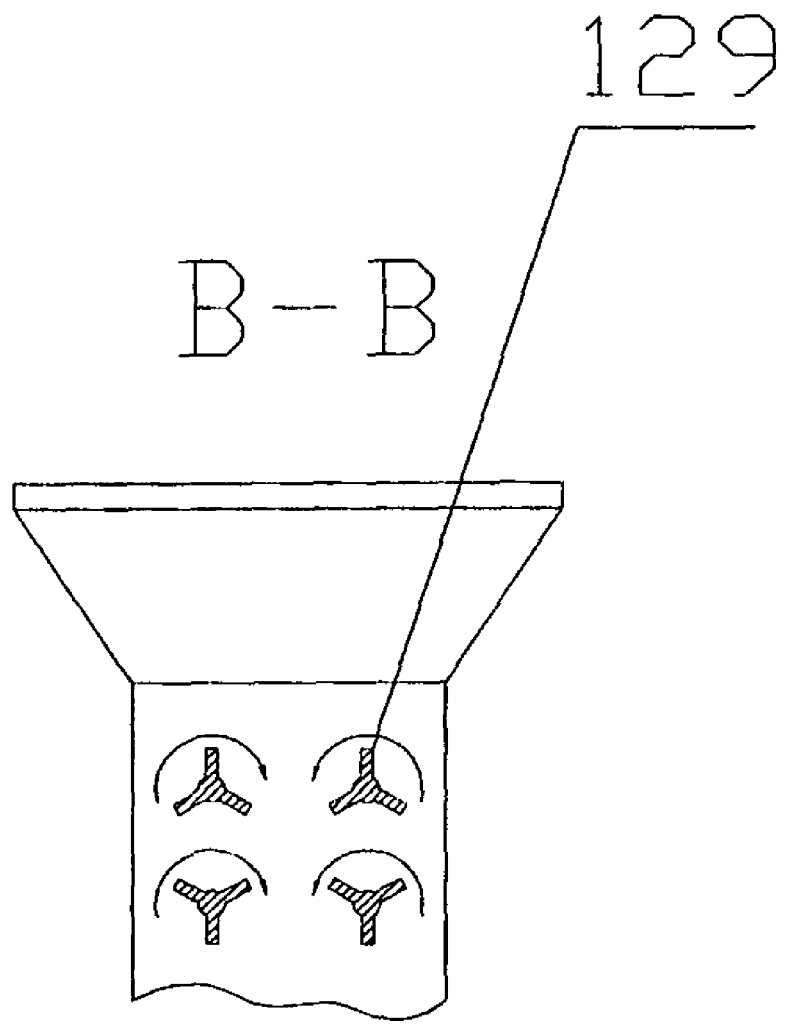
FIG. 9 is a cross-sectional view of an embodiment of a hopper component of the feeding system.

In aspects of the present invention that include more than one pressure shutter 129 (see FIG. 9 which depicts multiple pressure shutters), such as two pressure shutters 129, each of the first and second pressure shutters 129 can include a gear 106, 107 disposed thereon, wherein the gears 106, 107 are in communication with each other due to the presence of a transmission chain 131. Activation of the pressure shutter power source 130 causes rotation of the transmission chain 131. Rotation of the transmission chain 131 causes rotation of the gears 106, 107 disposed on the first and second pressure shutters 129 and hence, causes rotation of the first and second pressure shutters 129. Gears 106, 107 may also be driven by other means, such as by an electric motor, hydraulically, belt driven, screw driven, or otherwise.

Aspects of the aforementioned feeding system, as well as aspects of the discharging system and reactor, can be electronically controlled by a programmable logic controller. For example, in certain embodiments, the programmable logic controller can be programmed such that an entire cycle of the present invention can be carried out automatically. This may be further illustrated in particular steps of the following example of a method of vaporizing materials or a method of converting waste materials into fuel and discharging any non-vaporized materials.

The method may include any or all of the following steps, not necessarily in the order as described, and all steps are capable of being automatically controlled by the programmable logic controller.

A motor is activated whereby the motor facilitates rotation of a first and a second gear, wherein the second gear is provided on the reaction vessel 108, causing the reaction vessel 108 to rotate. An apron conveyor 101 is also activated and waste plastic and/or rubber are automatically transported to a hopper 103. A vertical slide board 105 is provided in the hopper 103 and includes a catalyst electromagnetic entrance 104. The entrance 104 is activated such that a predetermined amount of catalyst enters the hopper 103. The reaction vessel 108 and, if applicable, the supporting tubes 122, are heated. Such heating may take place inside of a kiln 139.

While the reactor 108 is being heated, the materials and catalyst can fill the hopper 103. When the materials reach a predetermined level in the hopper 103, a material level switch 102 may be activated, which can cause the apron conveyor 101 to stop. One or more pressure shutters 129 begin to rotate and move the materials from the hopper 103 into a feeding tube 125. A propelling pole 127, 150 is then activated and pushes the materials from the feeding tube 125 into and through a reaction vessel shaft 124, although some of the material can remain in the shaft 124.

Once the material is inside of the reactor it can be transformed from a solid to a liquid state with the increasing temperature. The liquid can be converted into a gas or vapor phase in the presence of the catalyst. Any materials that are not ultimately converted into the vapor phase can become unwanted residue inside of the reactor 108. As the residue is formed, it can become scooped up into shovels 121 located inside of the vessel 108. As the vessel 108 rotates and the shovel reaches the top portion of the vessel 108, the residue spills out of the shovel 121 and falls into a first discharge tube 111. In an embodiment that incorporates one or more residue collectors 109, the residue falls into the residue collector 109 and is then transported into the first discharge tube 111.

After activation of a power source or motor 117, power is transferred, through the clutch 116 and reducing mechanism 115, to a helix thruster 118 housed inside of the first discharge tube 111. As power is transferred, the helix thruster 118 begins to rotate. A spiral vane disposed thereon shuttles the residue to an end of the tube 111 that is outside of the vessel 108. The residue can then be transported directly into a residue storage tank 119, or it can travel through a second discharge tube 120, on its way into the residue storage tank 119.

If one or more residue collectors 109 are present, as the helix thruster rotates, its first gear 122 engages a second gear 123 of a driven shaft supporting one or more forks 110. The fork(s) 110 rotates and scrapes residue from the inner sides of the residue collector 109 and facilitates its movement into the first discharge tube 111.

The vapor inside of the vessel 108 flows through the oil or gas output tube 112 and exits the vessel 108. This vapor can then be condensed in a condenser 133, and in certain embodiments, certain dust impurities carried by the vapor are separated in a settler and/or the vapor is passed through a filter 113. The condensate is then transmitted from the condenser 133 through an oil-water separator (not shown) to obtain an oil phase product. The oil phase product is then brought into a mixing tank (not shown) and a catalyst is added to the mixing tank to improve the stability of the oil phase product against oxidation. Finally, the oil phase product can be refined to produce gasoline, diesel oil, or other hydrocarbon fractions.

In another embodiment, the reaction vessel 108 begins to rotate and the programmable logic controller performs an internal examination of all systems including the feeding system, the discharging system, and the reactor itself. If all systems are properly functioning, the heater 137 is ignited and the inside of the reaction vessel 108 is brought to a temperature of about 500° C. or less, and outside of the vessel 108 can reach about 800° C. or less. The apron conveyor 101 is then activated and waste plastic or the like is transported into the hopper 103. When the plastic in the hopper 103 reaches a particular level below the material level switch 102, such as 1 cm below, the apron conveyor 101 is automatically stopped and the pressure shutter motor 130 is activated, which, in turn, activates the pressure shutter(s) 129 and causes it to rotate. The pressure shutter(s) 129 can remain active for any length of time, and in certain embodiments, is automatically deactivated or stopped when the level of plastic reaches a predetermined distance from the material level switch 102, such as about 18 cm below the switch 102. Once the pressure shutter motor 130 is deactivated, the hydraulic work station 128 is automatically activated and causes the propelling pole 127 to push the materials through the feeding tube 125 and shaft 124 and into the reactor 108, although some of the materials remain in the shaft 124. The materials are then vaporized and the residue is discharged as previously described above.

From the foregoing, it is believed that one of skill in the art will readily recognize and appreciate the novel advancement of this invention over the prior art and will understand that while the same has been described herein and associated with preferred illustrated embodiments thereof, the same is nevertheless susceptible to variation, modification and substitution of equivalents without departing from the spirit and scope of the invention which is intended to be unlimited by the foregoing except as may appear in the following appended claims.

What is claimed is:

1. An apparatus comprising:
   a reactor having a wall extending between a first end and a second end of the reactor;
   a reaction vessel shaft protruding through the first end of the reactor;
   a means for feeding materials into the reaction vessel shaft;
   a fuel output tube protruding through the second end of the reactor;
   at least one shovel housed inside of the reactor;
   a discharge tube having a first end and a second end, the first end of the discharge tube being housed inside of the reactor and the second end of the discharge tube protrudes out of the fuel output tube, further wherein the discharge tube includes a helix thruster housed therein, said helix thruster comprising a driver shaft, a spiral vane disposed thereon, and a first gear at an end of the driver shaft housed inside of the reactor,
   wherein the second end of the discharge tube protrudes through a filter, which is in communication with the fuel output tube;
   at least one residue collector housed inside of the reactor wherein the residue collector is disposed on the first end of the discharge tube housed inside of the reactor, wherein the residue collector includes at least one fork disposed therein and wherein the at least one fork is disposed on a driven shaft and the driven shaft comprises a second gear, which engages the first gear of the helix thruster inside of the reactor; and
   a power source in communication with the helix thruster, wherein the power source is a motor.

2. The apparatus of claim 1, wherein the at least one shovel is disposed on an inside of the wall of the reactor.

3. The apparatus of claim 1, wherein the means for feeding materials into the reaction vessel shaft comprises:
   a hopper including a material level sensor and a first pressure shutter disposed therein, the first pressure shutter in communication with a pressure shutter power source, wherein the pressure shutter power source is an electric motor;
   an apron conveyor configured to shuttle materials into the hopper;
   a feeding tube in communication with the hopper, the feeding tube having a first end and a second end, wherein the second end of the feeding tube is in communication with the reaction vessel shaft;
   a propelling pole which pushes the materials from the feeding tube, through the reaction vessel shaft, and into the reactor; and wherein a second pressure shutter is disposed in the hopper and each of the first and second pressure shutters include a gear disposed thereon, wherein the gears are in communication with each other due to the presence of a transmission chain and activation of the electric motor causes rotation of the transmission chain, which, in turn, causes rotation of the first and second pressure shutters.

4. The feeding system of claim 3, further comprising a vertical slide board disposed in the hopper and dividing the hopper into a first section and a second section, the first section including the material level sensor and being in communication with the apron conveyor and the second section being configured to store a catalyst therein.

5. The feeding system of claim 4, wherein the vertical slide board comprises a catalyst electromagnetic entrance.

6. The feeding system of claim 3, wherein the propelling pole is a member selected from the group consisting of a hydraulic ram and a variable screw-pitch helix thruster.

7. The feeding system of claim 3, further comprising a programmable logic controller, wherein one or more of the first pressure shutter, the second pressure shutter, the apron conveyor, and the propelling pole are electronically controlled by the programmable logic controller.

8. A method of converting waste materials into a fuel condensate comprising the steps of:
providing the apparatus of claim 1;
wherein the means for feeding materials into the reaction vessel shaft comprises an apron conveyor in communication with an upper end of a hopper, a feeding tube in communication with a lower end of the hopper, a propelling pole in communication with the feeding tube and the reaction vessel shaft in communication with the feeding tube and the first end of the reactor;
rotating the reactor;
heating the reactor;
transporting the materials and a catalyst into the hopper;
moving the materials from the hopper to the feeding tube;
activating the propelling pole to push the materials from the feeding tube through the reaction vessel shaft and into the reactor;
vaporizing the materials inside of the reactor;
collecting any of the materials that were not vaporized in the shovel and transporting the materials from the shovel to the residue collector;
activating the power source in communication with the helix thruster thereby causing rotation of the driver shaft of the helix thruster and the first gear of the driver shaft, said first gear engaging the second gear of the driven shaft of the fork, wherein rotation of the first gear causes rotation of the second gear;
scraping with the fork the materials that were not vaporized from an inner side of the residue collector, thereby moving these materials into the discharge tube;
transporting the materials from the discharge tube to a residue storage tank;
transporting the vapor through the fuel output tube and the filter to a condenser; and
condensing the vapor.

9. The method of claim 8, further comprising the step of:
transporting the condensed vapor from the condenser through an oil-water separator to obtain an oil phase product.

10. The method of claim 9, further comprising the steps of:
transporting the oil phase product to a mixing tank and adding a catalyst to the mixing tank.

11. The method of claim 10, further comprising the step of:
refining the oil phase product to produce gasoline, diesel oil, and/or other hydrocarbon fractions.

* * * * *